United States Patent
Smith

(10) Patent No.: US 8,839,594 B2
(45) Date of Patent: Sep. 23, 2014

(54) CONCRETE EXCLUSION STRUCTURE

(75) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 645 days.

(21) Appl. No.: 13/135,279

(22) Filed: Jun. 29, 2011

(65) Prior Publication Data

US 2013/0004232 A1 Jan. 3, 2013

(51) Int. Cl.
*E04C 3/00* (2006.01)
*H02G 3/08* (2006.01)

(52) U.S. Cl.
CPC .............. *H02G 3/088* (2013.01); *H02G 3/083* (2013.01)
USPC ................. 52/848; 52/220.8; 174/50

(58) Field of Classification Search
CPC ..................... H02G 15/013; H02G 15/113
USPC ........... 174/92, 50, 135; 52/220.8, 848
See application file for complete search history.

(56) References Cited

U.S. PATENT DOCUMENTS

| | | | | |
|---|---|---|---|---|
| 2,771,502 A | * | 11/1956 | King et al. | 174/92 |
| 2,867,680 A | * | 1/1959 | Stecher | 174/92 |
| 3,453,788 A | | 7/1969 | Marin | |
| 3,518,358 A | * | 6/1970 | Brown | 174/138 F |
| 3,663,740 A | * | 5/1972 | Dellett | 174/92 |
| 3,783,178 A | | 1/1974 | Philibert et al. | |
| 3,916,086 A | * | 10/1975 | Gillemot et al. | 174/93 |
| 3,935,373 A | * | 1/1976 | Smith et al. | 174/77 R |
| 3,936,590 A | * | 2/1976 | Albano | 174/92 |
| 3,992,569 A | * | 11/1976 | Hankins et al. | 174/92 |
| 4,084,780 A | | 4/1978 | Mess | |
| 4,095,044 A | * | 6/1978 | Horsma et al. | 174/138 F |
| 4,117,259 A | * | 9/1978 | Giebel et al. | 174/92 |
| 4,135,587 A | * | 1/1979 | Diaz | 174/92 |
| 4,250,350 A | | 2/1981 | Polimine | |
| 4,347,402 A | * | 8/1982 | Reyners | 174/91 |
| 4,421,945 A | * | 12/1983 | Moisson | 174/92 |
| 4,486,620 A | * | 12/1984 | Ball et al. | 174/41 |
| 4,558,174 A | * | 12/1985 | Massey | 174/92 |
| 4,581,480 A | * | 4/1986 | Charlebois | 174/84 R |
| 4,620,815 A | * | 11/1986 | Goetter | 411/84 |
| 4,686,327 A | * | 8/1987 | Debbaut et al. | 174/88 R |
| 4,692,564 A | * | 9/1987 | Campbell et al. | 174/92 |
| 4,692,565 A | * | 9/1987 | Koht et al. | 174/93 |
| 4,875,952 A | * | 10/1989 | Mullin et al. | 156/48 |
| 4,933,512 A | * | 6/1990 | Nimiya et al. | 174/92 |
| 5,245,133 A | * | 9/1993 | DeCarlo et al. | 174/93 |
| 5,251,373 A | * | 10/1993 | DeCarlo et al. | 29/870 |
| 5,420,376 A | | 5/1995 | Rajecki et al. | |

(Continued)

FOREIGN PATENT DOCUMENTS

JP 2001182319 7/2001

*Primary Examiner* — Victor MacArthur

(74) *Attorney, Agent, or Firm* — Ware, Fressola, Maguire & Barber LLP

(57) ABSTRACT

A concrete exclusion structure is formed by a housing having a shell, end walls, and one or more score lines of reduced wall thickness. The housing defines an interior void that is dimensioned to enclose a coupler assembly. Knockouts in the end walls or knockout cones allow passage of tubes associated with the coupler assembly. The exclusion structure prevents uncured concrete from contacting the coupler assembly. The structure can fracture after the concrete has cured thereby allowing portions of the coupler assembly to move relative to each other. Such fracture is typically about one of the score lines.

21 Claims, 8 Drawing Sheets

(56) References Cited

U.S. PATENT DOCUMENTS

| | | | |
|---|---|---|---|
| 5,446,823 A * | 8/1995 | Bingham et al. ............. 385/135 |
| 5,466,890 A | 11/1995 | Stagnitti | |
| 5,498,839 A * | 3/1996 | Behrendt et al. ............. 174/92 |
| 5,556,060 A * | 9/1996 | Bingham et al. ............. 248/49 |
| 6,149,121 A | 11/2000 | Barton, Jr. | |
| 6,575,424 B2 | 6/2003 | Domizio | |
| 6,633,000 B2 * | 10/2003 | Kuo ............................. 174/92 |
| 6,721,483 B2 * | 4/2004 | Grubish et al. ............... 174/92 |
| 6,734,360 B2 | 5/2004 | Magno | |
| 6,874,821 B1 | 4/2005 | Sorkin | |
| 6,998,531 B2 | 2/2006 | Hull | |
| 7,282,644 B1 * | 10/2007 | Alvey ........................... 174/92 |
| 7,432,445 B2 * | 10/2008 | Bird et al. .................... 174/92 |
| 7,563,100 B1 | 7/2009 | Smith | |
| 2004/0084202 A1 * | 5/2004 | Angele ......................... 174/93 |
| 2005/0039940 A1 * | 2/2005 | Egan ......................... 174/65 R |
| 2008/0142243 A1 * | 6/2008 | Bird et al. .................... 174/92 |
| 2012/0036801 A1 * | 2/2012 | Colwell et al. ............. 52/220.8 |

* cited by examiner

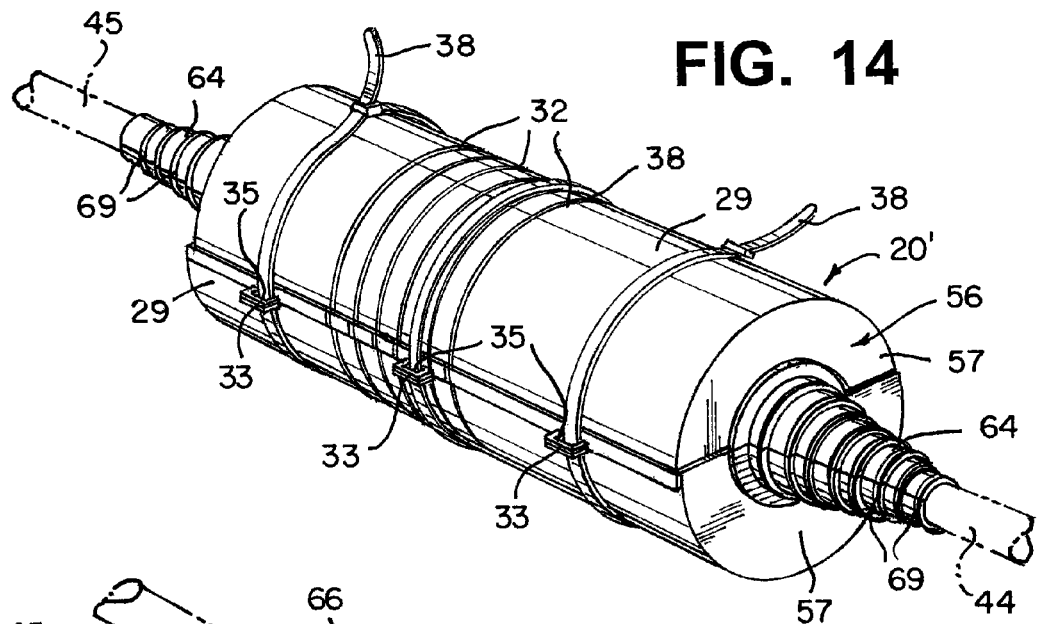
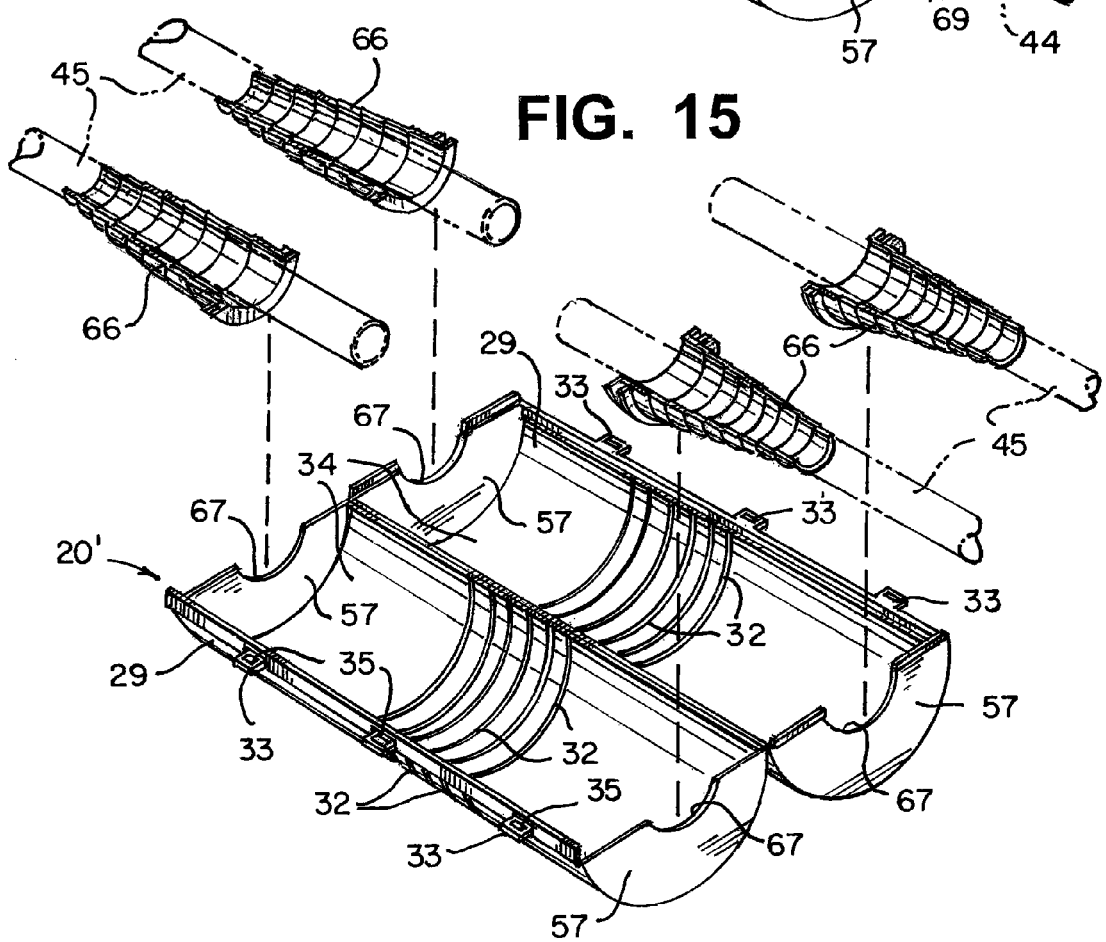

US 8,839,594 B2

CONCRETE EXCLUSION STRUCTURE

FIELD OF THE INVENTION

The present invention is directed to a concrete exclusion structure for providing an internal void for placement of an electrical coupling assembly within the structure and thereby preventing uncured concrete from entering the void and coming into contact with the coupling assembly. Such exclusion structures are typically to be used where construction members formed from concrete are used in building, road, bridge and other types of construction.

BACKGROUND OF THE INVENTION

It is common in the construction industry to use concrete as a primary component of construction members, such as those used for bridge construction, auto garage construction, and other types of commercial and industrial construction. In many such situations, it is necessary for electrical wiring to be passed from one construction member to another, such as between one bridge section and an adjacent bridge section.

It is common for a telescoping coupler assembly, such as that disclosed in U.S. Pat. No. 7,563,100, to be positioned between two construction members and thereby provide for passage of electrical wiring between the two construction members. Such a telescoping coupler assembly, however, needs to be positioned between the construction members so as to be relatively movable and thereby able to accommodate for movement of one construction member relative to the other, such as commonly occurs with bridge sections and the like. Other types of coupler assemblies may also be used, including expansion couplers, such as disclosed in U.S. Pat. No. 5,466,890, as well as deflection couplers, all of which accommodate for movement between the two construction members in which the coupler assembly is mounted. Expansion/compression couplers allow for either expansion or compression of the coupler due to movement of the construction members, whereas a deflection member allows for skewing or deflecting motion between the two construction members.

In all of these coupler assemblies, it is necessary for portions of the coupler assembly to be able to move with respect to each other, which thereby requires that these portions of the coupler assemblies not be encased in concrete in a manner that would prevent such motion.

In the past, it has been common to wrap such coupler assemblies with a wrapping material, such as a sheet-like foam material, fabric, and the like which would allow for concrete when poured about the coupler assembly to harden while still allowing portions of the coupler assembly to move relative to each other. Such wrapping of coupler assemblies has been found to be time consuming and not always efficacious in preventing uncured concrete from contacting such portions of the coupler assembly.

SUMMARY OF THE INVENTION

The present invention provides a solution to the need for wrapping coupler assemblies when coupler assemblies are installed in construction members which use concrete or other hardening materials. The present invention provides this solution by a concrete exclusion structure for a coupler assembly configured for receipt of metal tubes at each end thereof, the concrete exclusion structure comprising a housing having an elongated shell with an outer surface and an inner surface, and a first wall thickness, the inner surface of the shell defining a void dimensioned for receipt of a coupler assembly, the shell having at least one region with a second wall thickness less than the first wall thickness, the at least one region substantially positioned about a periphery of the shell, and end walls respectively positioned on each end of the elongated shell so as to enclose the void, each end wall having at least one knockout formed therein configured for removal so as to define an opening in the side wall dimensioned for passage of one of the metal tubes associated with the coupler assembly, wherein the shell is formed by two sections so as to allow receipt of the coupler assembly when the sections are in a first, opened, configuration and to enclose the coupler assembly when the sections are in a second, closed, configuration; wherein the end walls are each formed by two portions; and wherein the housing is formed from a material having sufficient rigidity to exclude unhardened concrete from the void but which can later fracture after the unhardened concrete has hardened, the later fracture at least about one of the at least one region with a second wall thickness.

Another embodiment of the invention is a concrete exclusion structure as described above further comprising an O-ring positioned between the opening in each end wall and the metal tube of the coupler assembly.

A further embodiment of the present invention is a concrete exclusion structure as described above, wherein the elongated shell is substantially cylindrical.

A still further embodiment of the present invention is a concrete exclusion structure, wherein each section of the cylindrical shell is in the shape of a half cylinder.

A still further embodiment of the present invention is a concrete exclusion structure, wherein the two portions of each end wall form a flat disc having an outer diameter the same as the outer diameter of the elongated cylindrical shell.

Another embodiment of the present invention is a concrete exclusion structure as described above, wherein each shell section includes a plurality of tabs extending outward and positioned along an edge of the section, each tab having an opening therein dimensioned for receipt of a tie wrap so that the concrete exclusion structure can be secured in its second, closed, configuration by securement of a tie wrap around both sections through openings in respective tabs of each section.

A still further embodiment of the present invention is a concrete exclusion structure as described above, wherein at least one of the portions forming each end wall has at least one extending member dimensioned for overlying a portion of the other portion of the end wall so as to provide structural rigidity to the concrete exclusion structure when in the second, closed, configuration.

A still further embodiment of the present invention is a concrete exclusion structure as described above, wherein the at least one region with a second wall thickness less than the first wall thickness is a score line which has a circular configuration when the concrete exclusion structure is in the second, closed, configuration.

A still further embodiment of the present invention is a concrete exclusion structure as described above, further comprising a plurality of the score lines so as to allow positionment of the concrete exclusion structure between a first construction member and a second construction member which the concrete exclusion structure spans so that at least one of the score lines is positionable between the first and second construction members and thereby provides a weakened area allowing for fracture of the concrete exclusion structure along the score line positioned between the first and second construction member after the unhardened concrete has hardened relative to each construction member.

A still further embodiment of the present invention is a concrete exclusion structure as described above, wherein the coupler assembly is a telescoping coupler assembly.

A still further embodiment of the present invention is a concrete exclusion structure as described above, wherein the coupler assembly is an expansion/compression or deflection type coupler assembly.

Another embodiment of the present invention is a concrete exclusion structure as described above, wherein the two portions of each end wall form a flat surface having an outer perimeter the same as the outer perimeter of the elongated shell.

A still further embodiment of the present invention is a concrete exclusion structure as described above, wherein each section of the shell is in the shape of a half shell.

BRIEF DESCRIPTION OF THE DRAWINGS

For a fuller understanding of the nature and objects of the present invention, reference is made to the following detailed description taken in conjunction with the following drawings in which:

FIG. 14 is a perspective view of the concrete exclusion structure embodiment shown in FIG. 13, showing the exclusion structure in a second, closed, configuration, as well as showing tie wraps for securing the concrete exclusion structure in the closed configuration and the passage of the metal tubes through the telescoping knockout cones.

FIG. 15 is an exploded view of the concrete exclusion structure embodiment shown in FIGS. 13 and 14, showing the exclusion structure in its first, opened, configuration.

DETAILED DESCRIPTION

Figure 1:
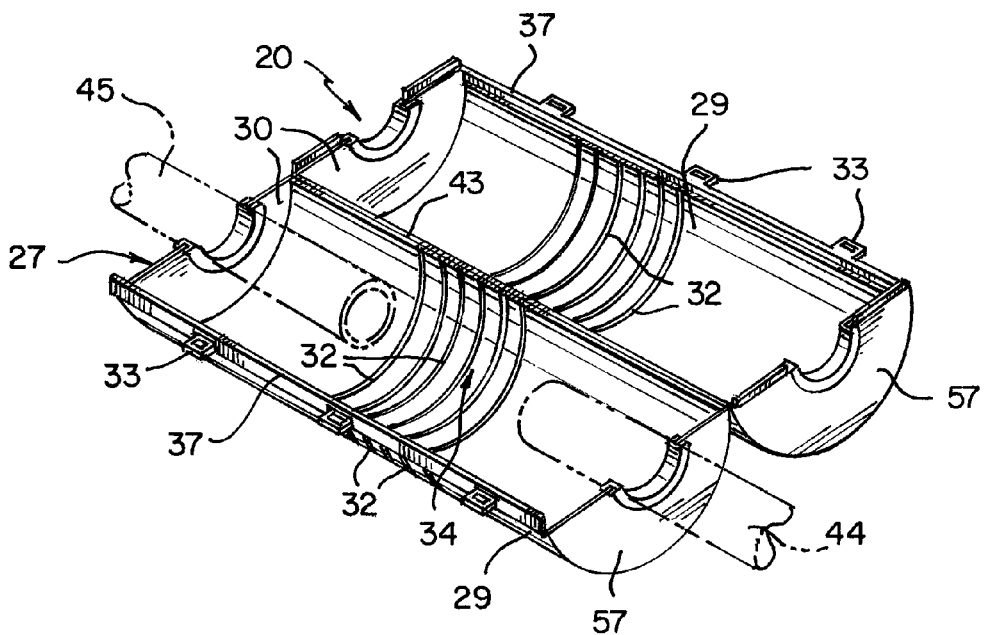
FIG. 1 is a perspective view of a concrete exclusion structure according to the present invention shown in a first, opened, configuration and showing placement of two metal tubes associated with a coupler assembly therein, as well as showing score lines formed in an elongated shell of the concrete exclusion structure.

In many construction environments, it is necessary to provide electrical wiring between two construction members that may exhibit relative movement to each other. Such construction members are found, for example, in bridge sections, portions of parking garage floors, floor sections, building sections, and the like. In many situations, it is necessary to provide electrical wiring which will span such construction members and thereby there is a need to allow such wiring to be safely positioned in both construction members while allow movement of the construction members relative to each other.

The industry has thereby provided for various types of coupler assemblies which can house electrical wiring and still provide for relative movement of the construction members in which the coupler assembly is installed. In most situations, the coupler assembly, such as a telescoping coupler assembly 40 shown in FIG. 4, includes a coupler body 42 comprising an elongated cylinder of a predetermined length having an opening therein for receipt of a metal tube 44 typically in the nature of an electrical conduit. The telescoping coupler assembly also typically includes a grounding ring 46 electrically connected to the coupler body 42 by means of a grounding strap 48. The grounding ring 46 is also dimensioned for receipt of a metal tube (electrical conduit) 45 and both the grounding ring and the coupler body include one or more fasteners 50 for securing the metal tube to either the coupler body or grounding ring. The metal tubes (conduits) 44 and 45 are able to move relative to each other since tube 45 can slide within coupler body 42. Further details concerning such a telescoping coupler assembly can be found in U.S. Pat. No. 5,763,100 hereby incorporated by reference.

Wires 54 which pass through these conduits or metal tubes 44 and 45 are thereby able to pass between the construction members while the electrical conduits with which they are associated can maintain an electrical ground therebetween due to the telescoping coupler assembly.

Figure 10:
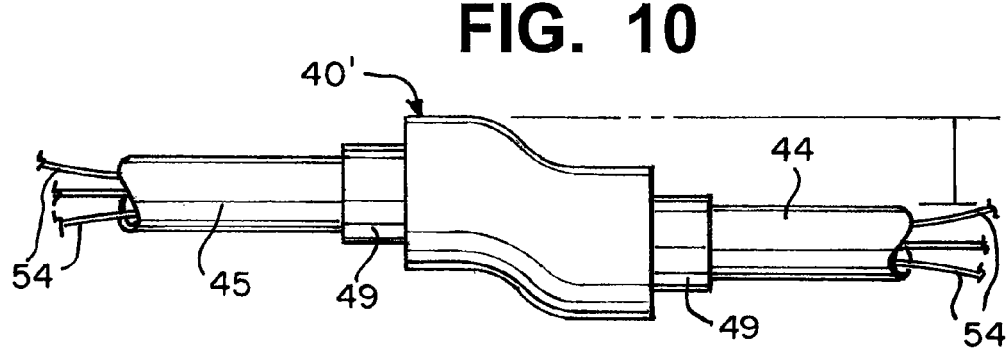
FIG. 10 is a perspective view of a deflection type coupler assembly undergoing a deflection.
Figure 11:
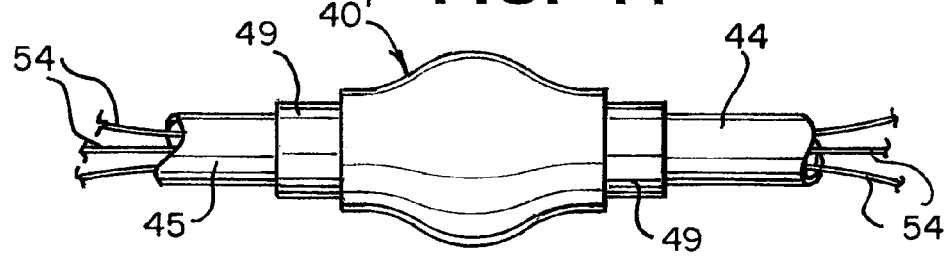
FIG. 11 is a perspective view of a coupler as shown in FIG. 9, undergoing compression.
Figure 12:
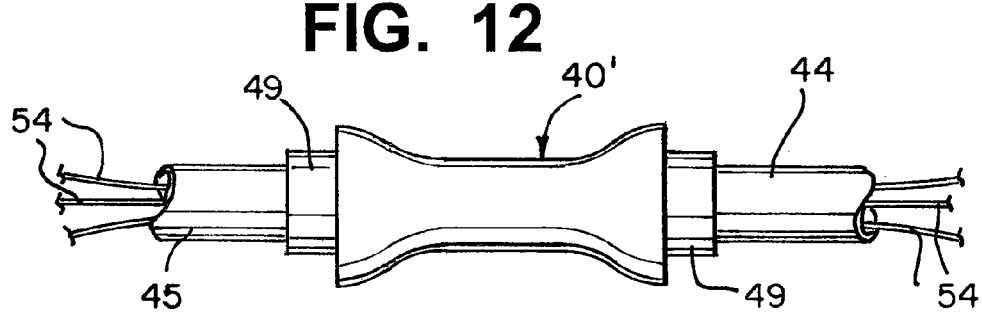
FIG. 12 is a perspective view of the coupler shown in FIG. 9 undergoing expansion.
Figure 13:
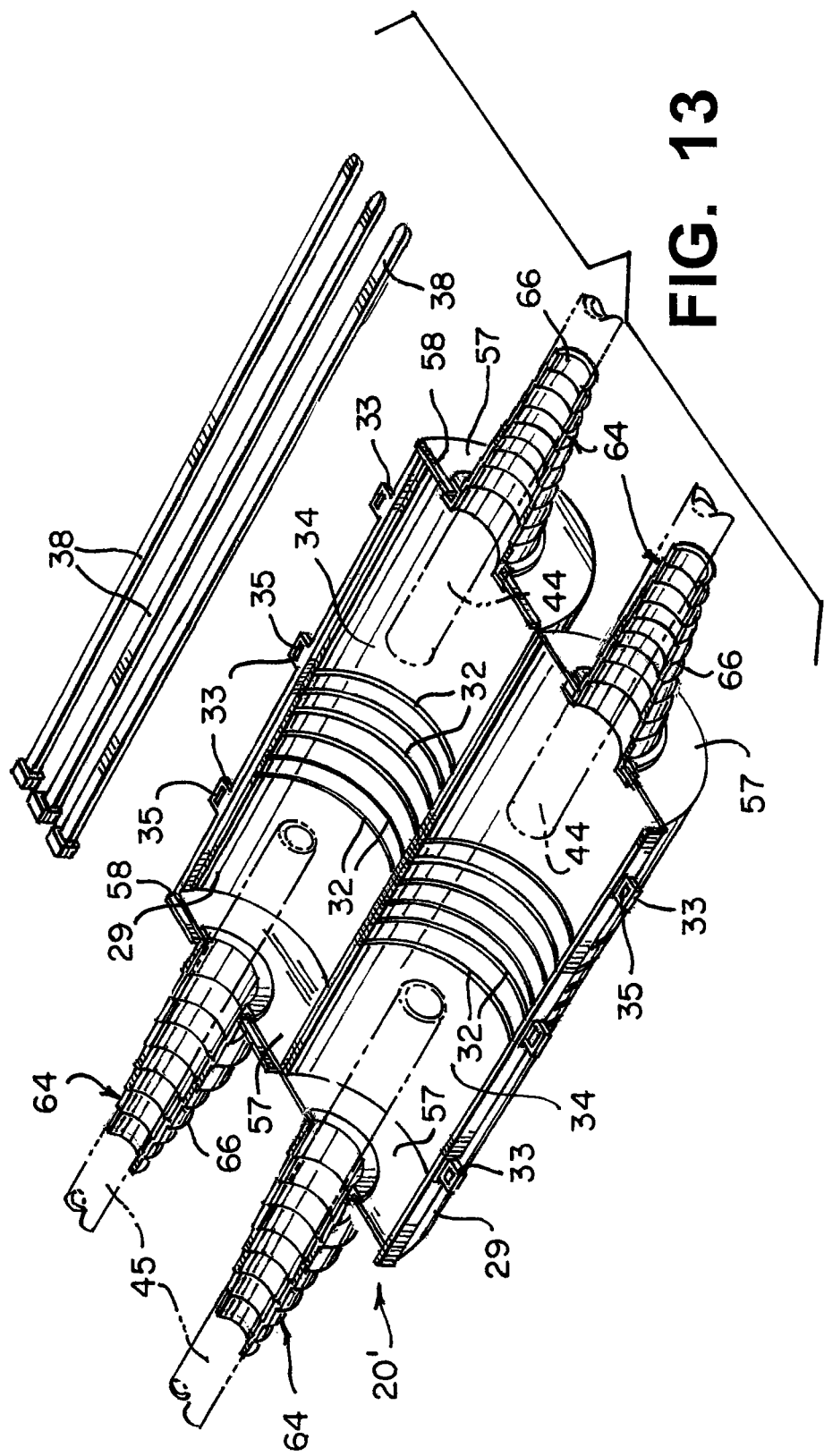
FIG. 13 is a perspective view of another embodiment of the concrete exclusion structure according to the present invention shown in a first, opened, configuration and showing placement of two metal tubes associated with a coupler assembly therein, as well as showing score lines formed in an elongated shell of the concrete exclusion structure and knockout cones attached to each end wall for passage of the metal tubes.
Figure 16:
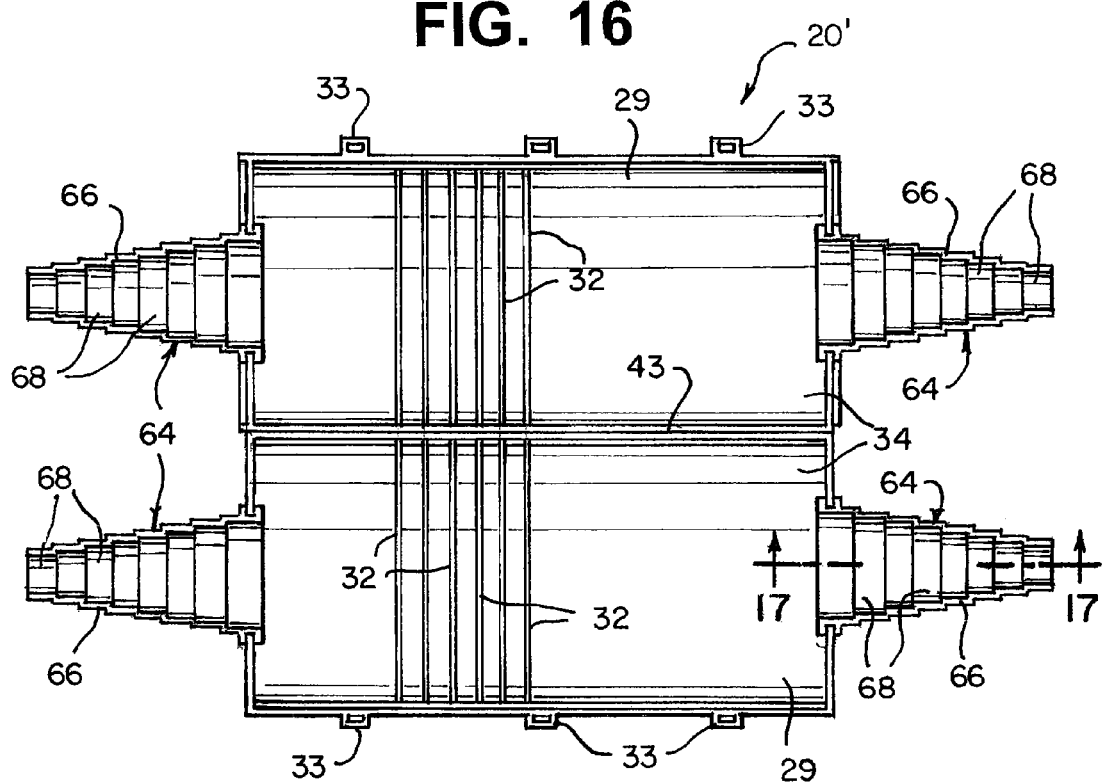
FIG. 16 is a top plan view of the concrete exclusion structure embodiment shown in FIGS. 13-15.

In addition to a telescoping coupler assembly which is used between construction members which can move relative to each other, it is sometimes also necessary to use other types of coupler assemblies, including expansion/compression and deflection coupler assemblies 40', such as shown in FIGS. 9, 10, 11, and 12. FIGS. 9-12 show that such expansion/compression or deflection coupler assemblies 40' allow for relative movement of construction members, including deflection as shown in FIG. 10, compression as shown in FIG. 11, and expansion as shown in FIG. 12.

Figure 4:
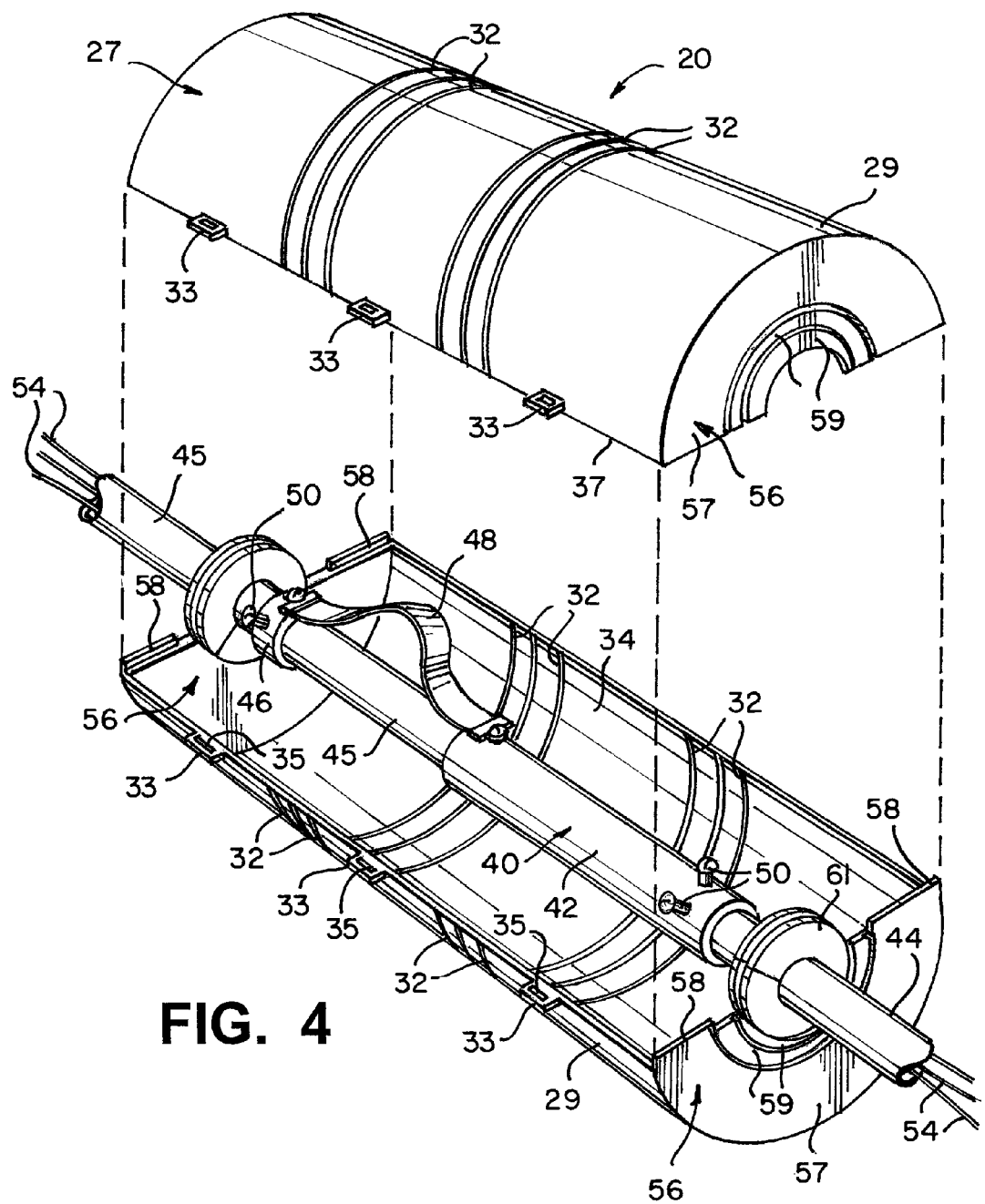
FIG. 4 is an exploded perspective view of the concrete exclusion structure according to the present invention, showing sections of the elongated shell physically separated from each other and showing positionment of a telescoping coupler within the void formed by the concrete exclusion structure, as well as O-rings positioned on the metal tubes at each end of the telescoping coupler assembly.

As seen in FIG. 4, it is apparent that if the coupler assembly did not have the ability to move relative to itself, then its functionality would not be achieved and therefore there would be a possibility that wires passing therethrough could break. It is therefore necessary when positioning such a coupler assembly between two construction members 24, 26 (see FIG. 2) during construction (for example, two portions of a bridge abutment) that before the concrete is poured, there be a means of preventing the uncured concrete from totally encapsulating the coupler assembly which would prevent the coupler assembly from performing its intended function.

In the past, this has been achieved by wrapping the coupler assembly with some type of material, such as a foam material, fabric, and the like which provides for preventing concrete associated with the construction members from coming into intimate contact with the moving portions of the coupler assembly, whether it be a telescoping coupler assembly, an expansion/deflection coupler assembly, and the like. Such moving portions are, for example, movement of grounding ring 46 of telescoping coupler assembly 40 with respect to coupler body 42 due to movement of pipe 45 relative to coupler body 42. Other movement of portions of coupler assemblies is shown in FIGS. 10-12 with respect to end portions 49.

Such need for wrapping of the coupler assembly prior to pouring concrete into the forms of the construction member to be fabricated, has been found to be very time consuming and not always totally effective in excluding the uncured concrete from coming into contact with the moving portions of the coupler assembly.

As seen in FIGS. 1-8 present invention provides a concrete exclusion structure 20 that effectively prevents the uncured concrete from coming into contact with the moving portions of the coupler assembly when the construction members are being formed. Thereafter, when the concrete has hardened into construction members, the relative movement of one construction member to the other causes the exclusion structure to fracture, especially with respect to areas where the wall thickness of the exclusion structure is less than that of the remaining wall thickness of the concrete exclusion structure. The construction members are shown diagrammatically in FIG. 2 as construction members 24 and 26. Each construction member would typically surround a portion of the concrete exclusion structure. The concrete exclusion structure 20 provides a void 34 (as explained below) in which the coupler assembly is positioned. The exclusion structure thereby prevents the unhardened concrete from contacting the portions of the coupler assembly which need to have relative movement therebetween.

In order to achieve this functionality, the concrete exclusion structure 20 has a housing 27 which in an embodiment comprises an elongated shell 28 and end walls 56. The elongated shell as shown in FIGS. 1-4 is typically formed in two sections 29. These shells can be cylindrical in shape or any other shape that can resist the weight of uncured concrete. The section 29 can be half cylindrical in shape, but one section could be larger (subtend more than 180 degrees) than the other section.

The shell sections include a plurality of score lines 32 which have a wall thickness less than the wall thickness of the material forming each shell section. The score lines or areas of reduced wall thickness 32 are typically positioned around the housing perpendicular to its longitudinal length as best seen in FIG. 4.

Figure 5:
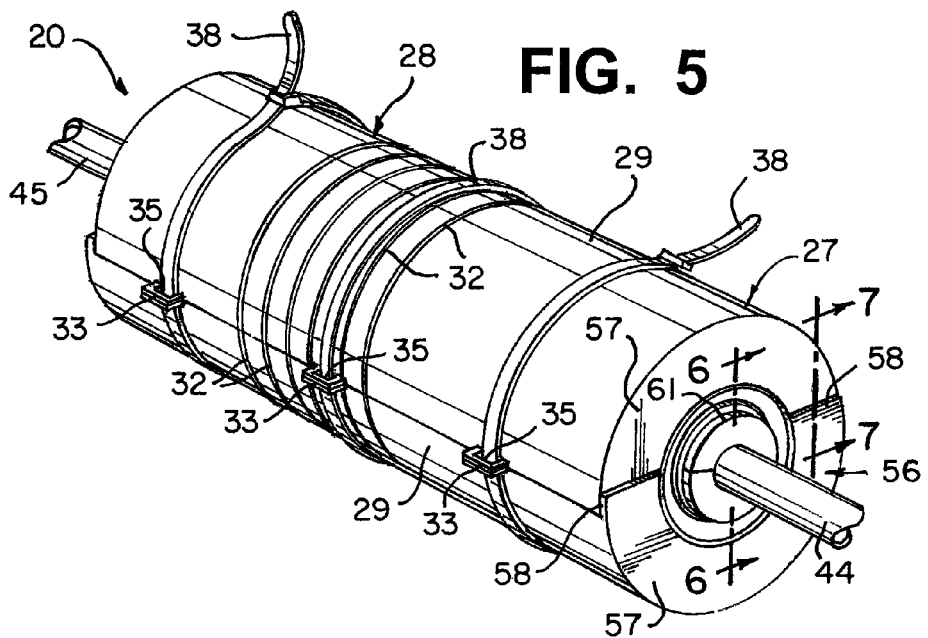
FIG. 5 is a perspective view of a concrete exclusion structure according to the present invention in its second, closed, configuration, showing tie wraps installed and further showing details of an extending member on one of the two portions forming an end wall so as to overlie the other portion of the end wall and thereby provide structural rigidity to the concrete exclusion structure when in the second, closed configuration.
Figure 8:
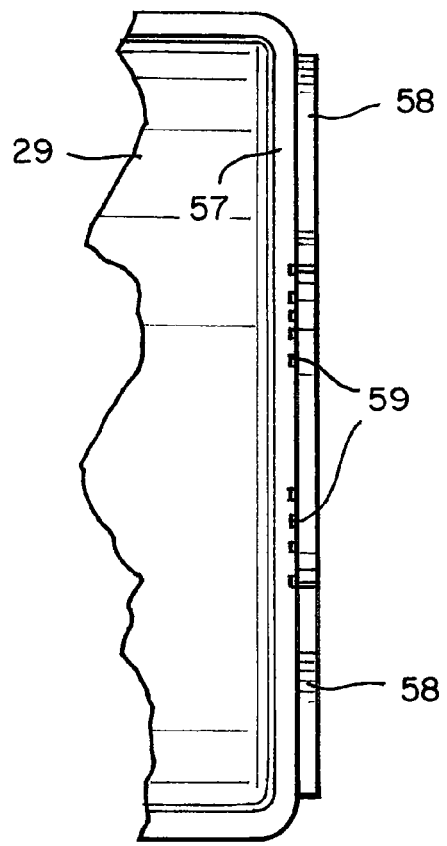
FIG. 8 is an end view of the concrete exclusion structure according to the present invention.
Figure 9:
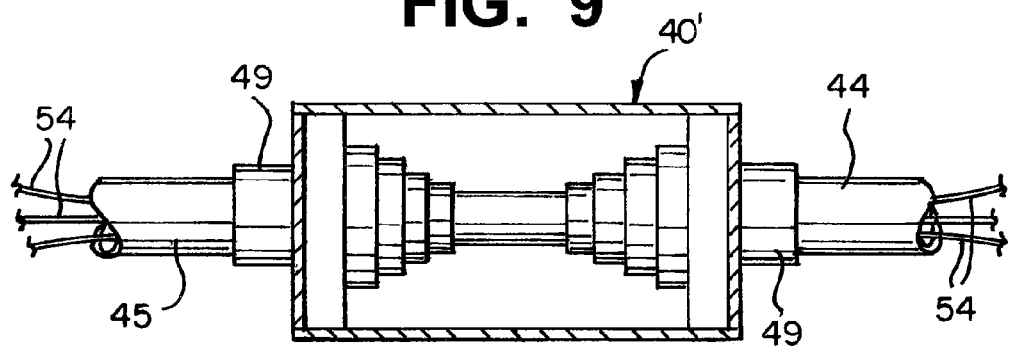
FIG. 9 is a perspective view of an expansion/compression type of coupler assembly.

The end walls 56 of the housing in combination with the shell totally enclose void 34 when the concrete exclusion structure 20 is in its closed configuration as shown in FIG. 5. Each end wall 56 is formed by two portions 57. When the concrete enclosure structure is made in a cylindrical shape as shown in FIGS. 1-4, each end wall portion 57 can have a semi-circular disc shape. The end wall portions are dimensioned to overlie each other as best seen in FIGS. 4, 5, and 8. In this regard, one end wall portion 57 has extending members 58 which partially overlies the adjacent end wall portion 57 so that when the enclosure structure is in its closed configuration, the extending members 58 help prevent concrete from entering void 34. This is best seen in FIGS. 1-5 and 7.

Figure 2:
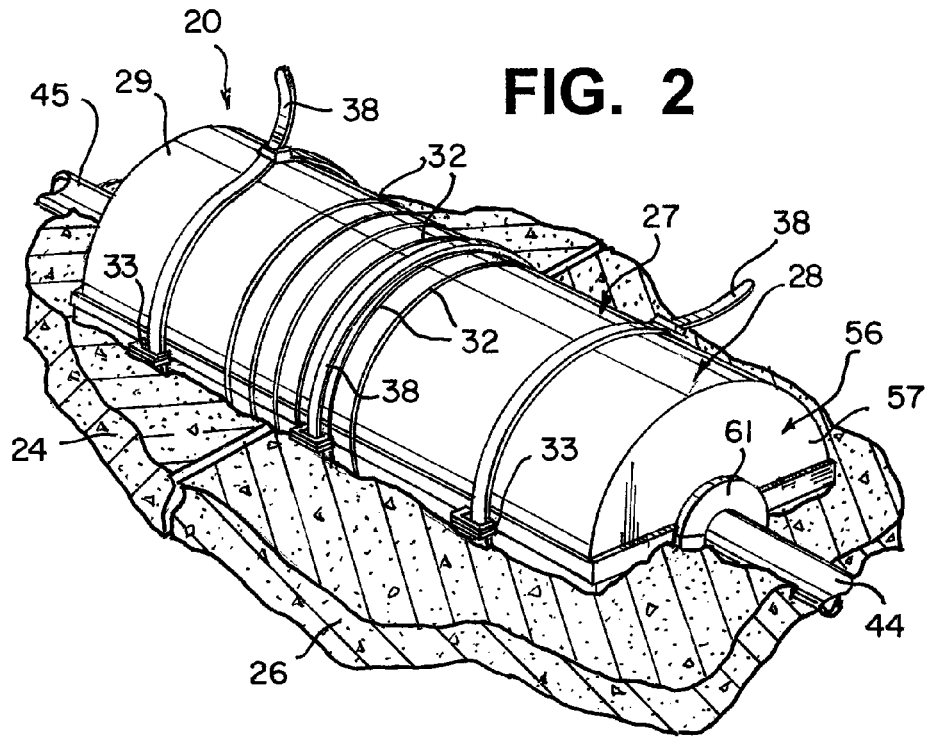
FIG. 2 is a perspective view of the concrete exclusion structure shown in FIG. 1, showing the exclusion structure in a second, closed, configuration, as well as showing tie wraps for securing the concrete exclusion structure in the closed configuration.
Figure 3:
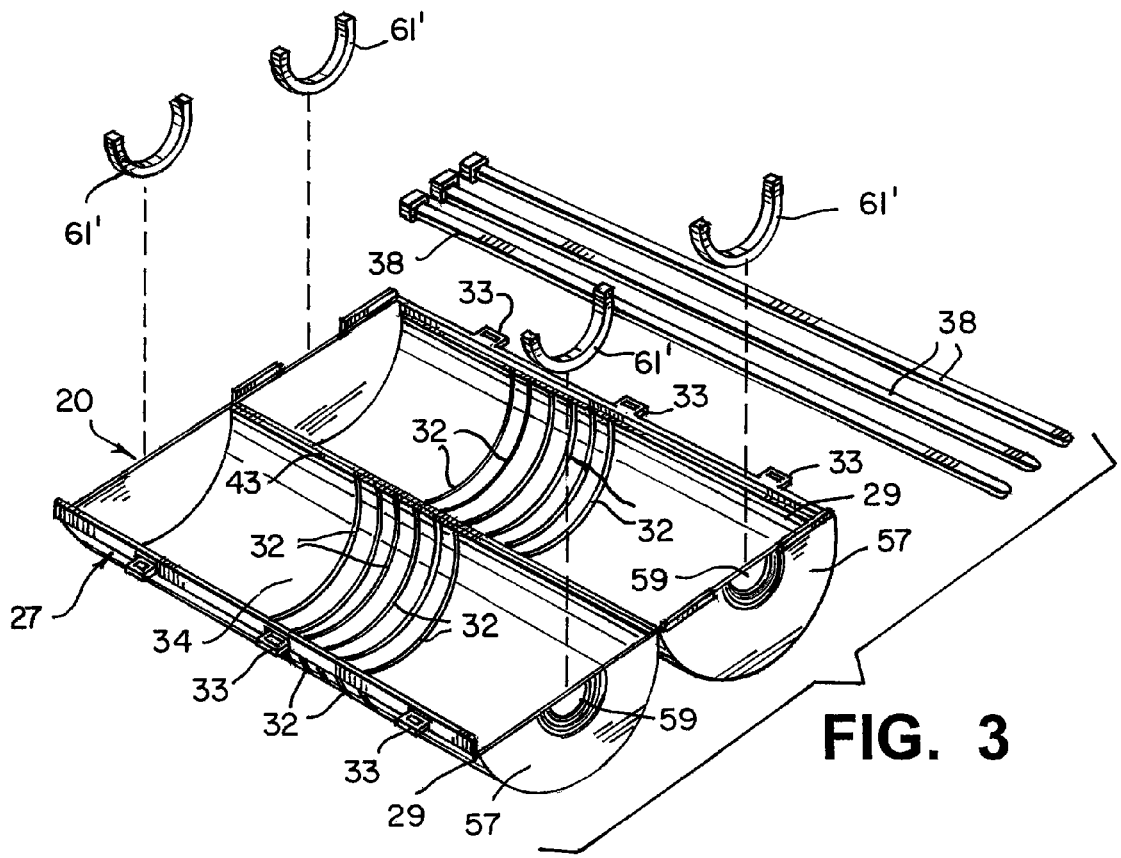
FIG. 3 is an exploded view of the concrete exclusion structure according to he present invention, in its first, opened, configuration showing tie wraps which are used as shown in FIG. 2 to maintain the exclusion structure in the closed configuration, as well as O-ring segments which can be positioned within knockouts of the end walls forming part of the concrete exclusion structure.
Figure 6:
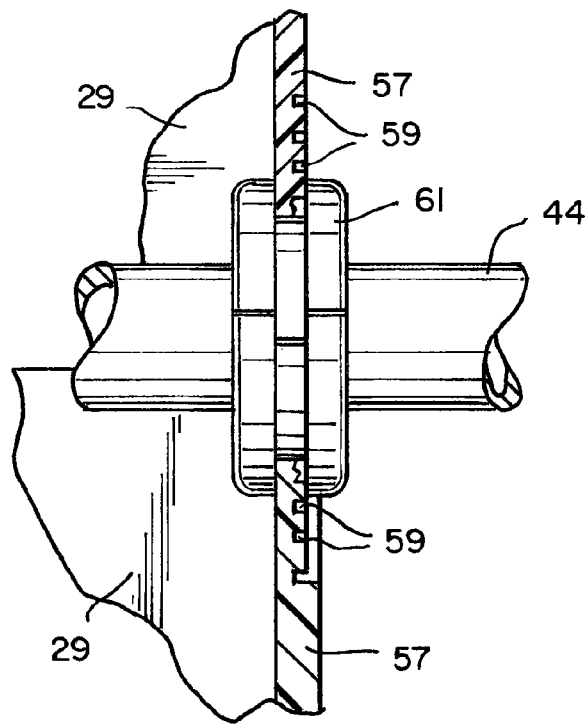
FIG. 6 is an enlarged cross-sectional view taken along lines 6-6 of FIG. 5 showing details of a metal tube associated with the telescoping coupler assembly passing through a knockout in an end wall of the concrete exclusion structure, as well as the end wall portions of the concrete exclusion structure and O-ring.
Figure 7:
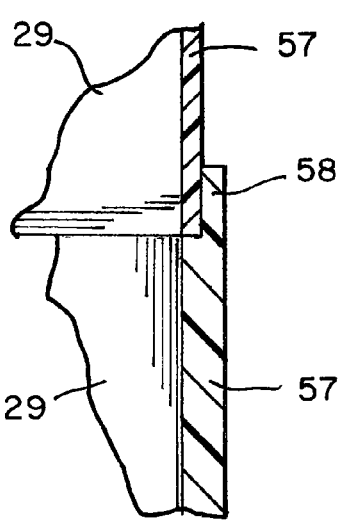
FIG. 7 is a cross-sectional view of the end wall portions of the concrete exclusion structure taken along line 7-7 of FIG. 5 showing the extending member overlying the other portion of the end wall.

The elongated shell sections 29 each can include a plurality of tabs 33 with openings 35 formed therein, the tabs positioned along an edge 37 of each elongated shell section and aligned with a corresponding tab of the other shell section so as to allow for passage of tie wraps 38 so as to secure the exclusion structure in its closed configuration as best seen in FIGS. 2 and 5. Furthermore, as seen in FIGS. 1 and 3, each shell section 29 can be hingedly attached to the other shell section along a second longitudinal edge 43 of each shell section. In this manner, when the concrete exclusion structure is in a first, opened, configuration as seen in FIG. 3, the coupler assembly and the associated tubes or conduits 44 and 45 for positionment therein can be placed within the concrete exclusion structure and then securely held in its second, closed, configuration as seen in FIGS. 2 and 6.

Furthermore, as best seen in FIGS. 1-3, each end wall section 57 includes a plurality of knockouts 59. The knockout with the correct size for receipt of the metal tube 44 and 45 is then removed for placement of the metal tube therein. Preferably an O-ring 61 is first secured between the portion of the end wall where the knockout has been removed so as to form a tight fit between the metal tube or conduit 44, 45 and the end wall sections 57 forming each overall end wall 56. The overall configuration is best seen in FIGS. 2, 5, and 6. Each O-ring can be an O-ring section 61' as seen in FIG. 3 or it can be a single uncut O-ring 61 which is positioned around the metal tube prior to placement within the portion of the end wall with the associated knockout removed.

When the concrete exclusion structure is in its second, closed, configuration as seen in FIGS. 2 and 5, concrete poured around a construction member, such as shown in FIG. 2, is thereby prevented from entering the void 34 formed within the concrete exclusion structure. Therefore, after the concrete has cured for each construction member, the coupler assembly 40, 40' is able to move relative to itself in response to movement of the construction members relative to themselves. This is achieved by allowing the concrete exclusion structure to break along one or more of the score lines 32 of the shell sections 29 forming housing 27.

More particularly, the concrete construction members 24 and 26 are poured to encapsulate two end portions of the concrete exclusion structure as seen in FIG. 2. After the concrete has cured for these construction members, the exposed score lines (score lines not embedded in the concrete) provide areas where the concrete exclusion structure can fracture, thereby allowing for relative movement of the coupler assembly while providing that the concrete does not come in contact with void 34 formed within the interior space of the elongated housing 27. By so doing, portions of the coupler assembly are able to move with respect to themselves when there is movement of the construction members relative to each other, while providing protection for the electrical wires 54 within the conduits 44 and 45. An eloquent solution is thereby obtained for installing coupler assemblies that span two construction members that exhibit relative movement.

Figure 17:
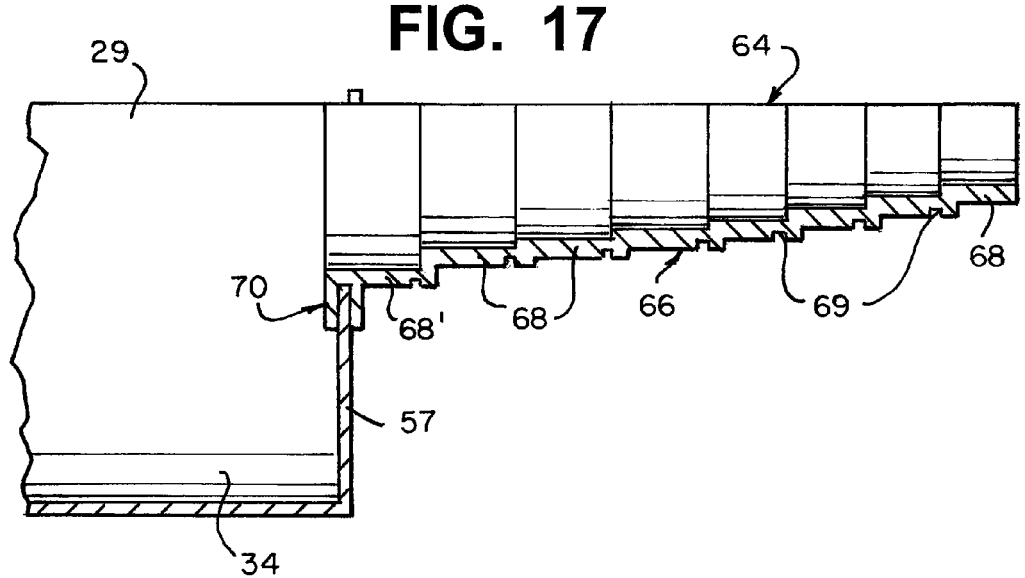
FIG. 17 is an enlarged view taken along line 17-17 of FIG. 16 showing a knockout cone section, as well as its interfitment with an end wall section.

FIGS. 13-17 illustrate another embodiment of the concrete exclusion structure 20'. This embodiment is similar to that shown in FIGS. 1-8 except that instead of a plurality of knockouts 59 associated with each end wall section 57, there is knockout cone 64 formed by two knockout cone sections 66. Each cone section 66 has a plurality of ring portions 68 which gradually reduce in diameter with the widest portion 68' configured for attachment to an end wall section 57 by use of a semicircular slot 70 as best seen in FIG. 17. Each ring portion 68 can be broken along score line 69. The knockout cone portion with an inside diameter corresponding to the outside diameter of the metal tube which is to be placed within the concrete exclusion structure 20' is then the last portion of the knockout cone section. The smaller diameter ring portions are removed by breaking them off at the appropriate score line 69. As seen in FIG. 14, this configuration allows pipes 44 and 45 to form a snug fitment between the outer wall of the pipe and the inner wall of the knockout cone, thereby facilitating placement of the metal pipes in the concrete exclusion structure.

In other respects, the embodiment of the concrete exclusion structure 20' shown in FIGS. 13-17 corresponds to the embodiment shown in FIGS. 1-8.

Although the present invention has been described with respect to preventing uncured concrete from entering the exclusion structure, other substances could be used to form the construction members. Consequently, the term "concrete" as used herein, including the claims, is deemed to include such other substances.

Furthermore, although the exclusion structure shown has an elongated shell, other configurations of the shell are possible (such as rectangular, square, or oval in cross-section) as long as the resulting housing can resist the weight of the uncured concrete or other uncured substance used to form the construction member. In such other configurations, the end walls 56 would have a flat surface having an outer perimeter the same as the outer perimeter of the elongated shell.

The exclusion structures 20 and 20' can be formed from any type of material that can readily fracture. Such material includes acrylonitrile butadiene styrene (ABS) plastic, nylon (polyamides), polyvinyl chloride (PVC), phenolic resin, polyethylene plastic, thermoplastic polymers and thermoset polymers.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A concrete exclusion structure for a coupler assembly configured for receipt of metal tubes at each end thereof, the concrete exclusion structure comprising:

a housing having:

an elongated shell with an outer surface and an inner surface, and a first wall thickness, the inner surface of said shell defining a void dimensioned for receipt of a coupler assembly, the shell having at least one region with a second wall thickness less than said first wall thickness, said at least one region substantially positioned about a periphery of the shell, said at least one region comprising at least one score line so as to allow positionment of the concrete exclusion structure between a first construction member and a second construction member which the concrete exclusion structure spans so that the at least one score line is positionable between the first and second construction members and thereby provides a weakened area allowing for fracture of the concrete exclusion structure along said at least one score line positioned between the first construction member and the second construction member after said unhardened concrete has hardened relative to each construction member, and end walls respectively positioned on each end of the elongated shell so as to enclose the void, each end wall having at least one knockout formed therein configured for removal so as to define an opening in the end wall dimensioned for passage of one of the metal tubes associated with the coupler assembly, wherein said shell is formed by two sections so as to allow receipt of said coupler assembly when the sections are in a first, opened, configuration and to enclose the coupler assembly when the sections are in a second, closed, configuration; and wherein said housing is formed from a material having sufficient rigidity to exclude unhardened concrete from said void but which can later fracture after said unhardened concrete has hardened, said later fracture at least about one of said at least one region with a second wall thickness.

2. The concrete exclusion structure according to claim 1, further comprising an O-ring positioned between said opening in each end wall and the metal tube of the coupler assembly.

3. The concrete exclusion structure according to claim 1, wherein the elongated shell is substantially cylindrical.

4. The concrete exclusion structure according to claim 3, wherein each section of the shell is in the shape of a half cylinder.

5. The concrete exclusion structure according to claim 4, wherein the two portions of each end wall form a flat disc having an outer diameter the same as the outer diameter of the elongated shell.

6. The concrete exclusion structure according to claim 5, wherein each shell section includes a plurality of tabs extending outward and positioned along an edge of the section, each tab having an opening therein dimensioned for receipt of a tie wrap so that the concrete exclusion structure can be secured in its second, closed, configuration by securement of a tie wrap around both sections through openings in respective tabs of each section.

7. The concrete exclusion structure according to claim 6, wherein at least one of the portions forming each end wall has at least one extending member dimensioned for overlying a portion of the other portion of said end wall so as to provide structural rigidity to the concrete exclusion structure when in the second, closed, configuration.

8. The concrete exclusion structure according to claim 3, wherein the two portions of each end wall forms a flat disc having an outer diameter the same as the outer diameter of the elongated wall.

9. The concrete exclusion structure according to claim 3, wherein the at least one score line has a circular configuration when the concrete exclusion structure is in the second, closed, configuration.

10. The concrete exclusion structure according to claim 1, wherein the coupler assembly is a telescoping coupler assembly and wherein the elongated shell has an overall length sufficient to provide said void with sufficient length for allowing the telescoping coupler assembly to function in its intended manner.

11. The concrete exclusion structure according to claim 10, wherein the housing is formed from a frangible material.

12. The concrete exclusion structure according to claim 11, wherein the frangible material is selected from the group consisting of acrylonitrile butadiene styrene (ABS) plastic, nylon (polyamides), polyvinyl chloride (PVC), phenolic resin, polyethylene plastic, thermoplastic and thermoset polymers.

13. The concrete exclusion structure according to claim 1, wherein the elongated shell is dimensioned so that the void is dimensioned for receipt of an expansion/compression or deflection type coupler assembly.

14. The concrete exclusion structure according to claim 1, wherein the two sections of the shell are hingedly attached to each other along one edge of each half.

15. The concrete exclusion structure according to claim 1, wherein the housing is formed from a frangible material.

16. The concrete exclusion structure according to claim 15, wherein the frangible material is selected from the group consisting of acrylonitrile butadiene styrene (ABS) plastic, nylon (polyamides), polyvinyl chloride (PVC), phenolic resin, polyethylene plastic, thermoplastic and thermoset polymers.

17. The concrete exclusion structure according to claim 1, wherein each section of the shell is in the shape of a half shell.

18. The concrete exclusion structure according to claim 1, wherein said end walls are each formed by two portions.

19. The concrete exclusion structure according to claim 18, wherein the two sections of the shell are hingedly attached to each other along one edge of each half.

20. The concrete exclusion structure according to claim 19, wherein the two portions of each end wall form a flat surface having an outer perimeter the same as the outer diameter of the elongated shell.

21. The concrete exclusion structure according to claim 1, wherein the at least one score line is a plurality of score lines so as to allow positionment of the concrete exclusion structure between a first construction member and a second construction member which the concrete exclusion structure spans so that at least one of the plurality of score lines is positionable between the first and second construction members and thereby provides a weakened area allowing for fracture of the concrete exclusion structure along said at least one score line positioned between the first and second construction member after said unhardened concrete has hardened relative to each construction member.

\* \* \* \* \*